United States Patent Office 3,417,103
Patented Dec. 17, 1968

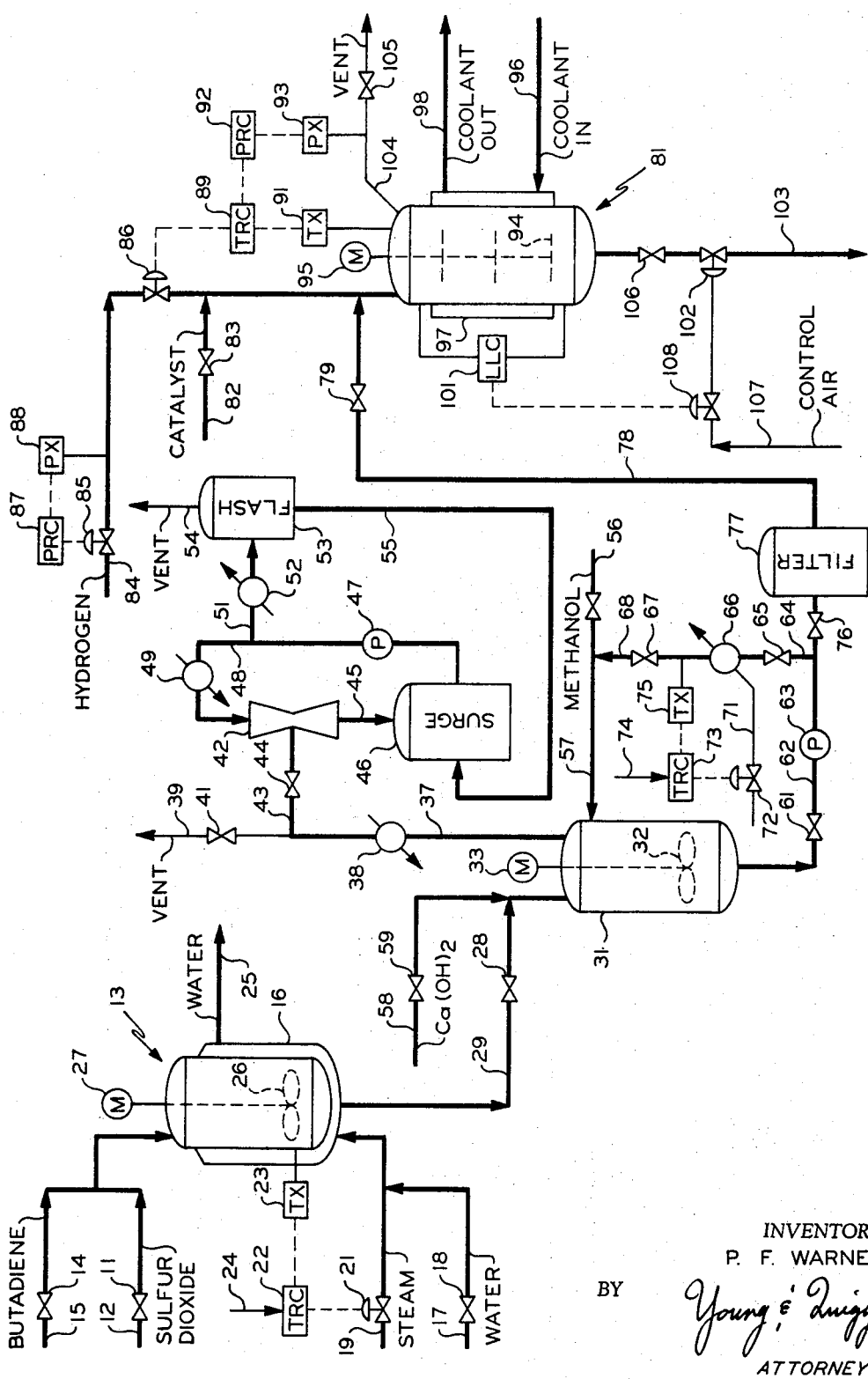

3,417,103
PRODUCTION OF SULFOLANE
Paul F. Warner, Phillips, Tex., assignor to Phillips Petroleum Company, a corporation of Delaware
Filed Nov. 21, 1966, Ser. No. 595,903
6 Claims. (Cl. 260—332.1)

ABSTRACT OF THE DISCLOSURE

Sulfur dioxide is removed from a solution of a sulfolene compound by subjecting the solution to a partial vacuum, adding a treating agent selected from the group consisting of calcium oxide, calcium hydroxide, magnesium oxide, magnesium hydroxide, and admixtures thereof to convert any remaining sulfur dioxide to the corresponding sulfite salt, the treating agent and the corresponding sulfite salt being insoluble in said solution, and filtering the thus treated solution to remove said sulfite salt. The solution is then subjected to hydrogenation conditions to convert the sulfolene compound to the corresponding sulfolane compound.

---

This invention relates to the production of a solfolane compound. In one aspect it relates to a process for the production of a sulfolane compound wherein the excess sulfur dioxide is chemically removed from the reaction product of sulfur dioxide with an unsaturated organic compound containing two or more ethylene linkages. In a particular aspect the invention relates to a process wherein sulfur dioxide is removed from a solution of a sulfolene compound in a suitable solvent by subjecting the solution to a reduction in pressure to liberate a portion of the sulfur dioxide contained therein, adding a treating agent selected from the group consisting of calcium oxide, calcium hydroxide, magnesium oxide and magnesium hydroxide to the thus treated solution to convert the sulfur dioxide to an at least partially insoluble sulfite salt and filtering the solution to remove the insoluble salts, insoluble unreacted and reacting reagent, and/or polymer.

In prior processes it has been proposed that the excess sulfur dioxide be removed from the sulfolene compound by the addition of hydrogen peroxide to convert the sulfur dioxide to sulfur trioxide, followed by the addition of sodium hydroxide to convert the sulfur trioxide to a sulfate salt. However, some corrosion difficulties have been encountered in that sulfuric acid results from the addition of the hydrogen peroxide, and dilute sulfuric acid forms in the presence of water. This dilute acid is very corrosive to the apparatus. Considerable amounts of time are required during these oxidation and neutralization operations in making the analyses and computations necessary to assure that all of the sulfur dioxide is oxidized without adding an appreciable excess of hydrogen peroxide and that the pH is in the desired range. Problems have also been encountered in that the presence of excess sodium hydroxide can catalyze the formation of methyl sulfolanyl ether, an undesirable side reaction. Furthermore, it is generally necessary to maintain a fine balance between heat input and sulfur dioxide removal or sulfur dioxide will be generated by the cracking of the sulfolene as fast as sulfur dioxide is removed.

Accordingly, it is an object of this invention to provide an improved process for the production of a sulfolane compound. It is an object of the invention to eliminate corrosion problems in a sulfolane process which would otherwise occur with the use of hydrogen peroxide. Another object of the invention is to provide maximum removal of sulfur dioxide from a sulfolene compound in a minimum of time. Another object of the invention is to avoid catalyzing the formation of methyl sulfolanyl ether. Another object of the invention is to remove excess sulfur dioxide from a sulfolene product without the use of hydrogen peroxide. Yet another object of the invention is to convert any sulfur dioxide in a sulfolene product to a sulfite salt which will not interfere with hydrogenation of the sulfolene product to a sulfolane product and which will not present problems of corrosion. A further object of the invention is to provide an improved process for the removal of polymer solids from a sulfolene product.

Other objects, aspects and advantages of the invention will be apparent to one skilled in the art from a study of the disclosure, the drawings and the appended claims to the invention.

The term "a sulfolene" as employed herein and in the appended claims defines generically the unsubstituted and substituted unsaturated compounds comprising or containing a sulfolene nucleus, i.e., a 5-membered ring of 4 carbon atoms and a sulfur atom with a single olefinic linkage between two adjacent carbon atoms of said ring, and 2 oxygen atoms each of which is directly attached to said sulfur atom. Thus the generic term "a sulfolene" covers the simple unsubstituted sulfolenes, viz, the 3-sulfolene having the general structure.

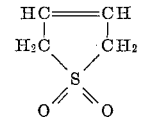

and the 2-sulfolene having the structure

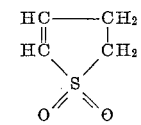

as well as the various substituted derivatives thereof, i.e., sulfolene compounds in which various organic and/or inorganic and particularly hydrocarbon radicals, i.e., alkyl, alkenyl, aryl, aralkyl, alkaryl, alicyclic and/or heterocyclic radicals, and/or such inorganic radicals as do not interfere with the hydrogenation reaction, are substituted for one or more of the hydrogen atoms of the above structures of the unsubstituted sulfolenes. In general the sulfolene molecule will contain a total of from 4 to 12 carbon atoms.

Similarly, the term "a sulfolane" as employed herein and in the appended claims refers to a saturated sulfolene compound which may be either unsubstituted or substituted. In other words, the sulfolane compound contains or consists of a saturated five-membered ring of four carbon atoms and a sulfur atom, the latter having two oxygen atoms directly attached thereto. The structural formula of the simple unsubstituted sulfolane, therefore, is

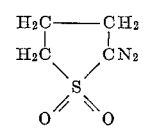

The generic term "a sulfolane" or "a sulfolane compound" covers not only the above compound but also the substituted derivatives thereof, particularly those in which various radicals mentioned in the preceding paragraphs are substituted for one or more of the hydrogen atoms of the above structure. Where such a radical is hydrogenatable under the conditions of the present process, it will be understood that the sulfolane containing the hydrogenated radical is included when reference is made to a sulfolane compound which "corresponds" to a given sulfolene compound. Thus, an alkyl sulfolane, such as a propyl or butyl sulfolane, corresponds to the alkenyl, such as allyl or butenyl, respectively, sulfolene.

The material know as sulfolane, i.e., 2,3,4,5-tetrahydrothiophene-1,1-dioxide, has found valuable uses as an intermediate in the production of other useful organic chemicals, and as a selective solvent for hydrocarbons of various types, fatty acids or fatty acid esters, and the like. Various derivatives thereof have also been likewise employed, particularly 2,4-dimethylsulfolane, which has been used as a selective solvent to separate aromatic hydrocarbons from petroleum fractions.

The sulfolene compounds can be prepared by reacting sulfur dioxide with at least one sulfolene precursor compound having the structural formula:

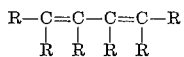

wherein each R is selected from the group consisting of hydrogen and various organic and/or inorganic radicals which do not interfere with the reaction to produce the sulfolene compound or the subsequent hydrogenation reaction to produce the corresponding sulfolane compound. Inorganic radicals which are suitable include the halogens, hydroxyl groups, and the like. A presently preferred class of starting materials comprises the conjugated diolefins of the structural formula indicated where each R is individually selected from the group consisting of hydrogen, alkyl, alkenyl, aryl, cycloalkyl and cycloalkenyl and combinations thereof such as aralkyl, alkaryl and alkylcycloalkyl, where the total carbon content of the molecule is in the range of 4 to 12. Representative examples of the unsaturated organic compound include 1,3-butadiene, 2-methyl-1,3-butadiene (isoprene), 1,3-pentadiene (piperylene), 2,3-dimethyl-1,3-butadiene, 2,3-diethyl-1,3 - butadiene, 2,3-ditertiary-butyl-1,3-butadiene, 2 - tertiary - butyl-1,3-butadiene, 3,4-dimethyl - 2,4 - hexadiene, 3,4 - diethyl-2,4-hexadiene, 2,4-dodecadiene, 2-methyl-1,3-pentadiene, 2-methyl-1,3-hexadiene, 2,4-dimethyl-2-hexadiene, 4-ethyl-1,3-hexadiene, 2-cyclopentyl - 1,3 - butadiene, 1 - cyclopentyl-1,3-pentadiene, 1-cyclohexyl-1,3 - butadiene, 1 - (1-cyclohexene-1-yl)-1,3-butadiene, 2-phenyl-1,3-butadiene, 3-benzyl-1,3-pentadiene, 2-benzyl-1,3-butadiene, 3-p-tolyl-1,3-pentadiene, 2-m-tolyl-1,3-butadiene, and the like and their homologues and analogues. Also, suitable substituted derivatives of the above and like polyolefins may be reacted with sulfur dioxide to form the desired mono-sulfones, examples of such substituted polyolefins being 2-chloro-1,3-butadiene, 2-methyl-3-chloro-1,3-butadiene, 1-cyano-1,3-butadiene, and the like.

Referring now to the drawing, there is illustrated a diagrammatic representation of a process in accordance with one embodiment of the invention. For the sake of simplicity, the process will be described in terms of a batch process for the production of 2,3,4,5-tetrahydrothiophene 1,1-dioxide (known as sulfolane) from 1,3-butadiene and sulfur dioxide. Valve 11 in line 12 is opened to pass sulfur dioxide from a suitable source thereof into batch reactor 13. Valve 14 in line 15 is opened to pass 1,3-butadiene from a suitable source thereto into reactor 13. The butadiene and sulfur dioxide are preferably reacted in reactor 13 in the absence of a solvent, although the present invention is applicable to purifying a sulfolene compound containing sulfur dioxide produced by any known method. The sulfur dioxide to butadiene mol ratio will generally be in the range of about 1:1 to about 1.6:1. While any suitable reaction temperature and pressure can be employed, the temperature in reactor 13 will generally be in the range of from about 100° F. to about 300° F., while the pressure in reactor 13 will generally be in the range of about 100 p.s.i.g. to about 600 p.s.i.g. In a presently preferred embodiment the sulfur dioxide is charged to reactor 13 at a temperature of approximately 140° F. After the sulfur dioxide is charged, the butadiene is added and the reactor temperature is permitted to rise slowly from the initiation temperature of about 140° F. to about 200° F. during the butadiene addition. After the butadiene addition is completed, the reactor contents are maintained at approximately 200° F. for a suitable time to permit substantial completion of the reaction. The temperature of reactor 13 is regulated by means of a heating jacket 16. Water is passed through line 17 and valve 18 into an inlet of jacket 16 while steam is injected into jacket 16 by way of line 19 containing valve 21. The valve 21 can be regulated by temperature recorder controller 22 responsive to a comparison of the actual temperature of the reactor contents as indicated by temperature sensor-transmitter 23 and the desired setpoint value 24. The water is withdrawn from heating jacket 16 by way of conduit 25. Agitation of the contents of reactor 13 can be provided by suitable means, such as stirrer 26 driven by motor 27. Suitable polymerization inhibitors, which can be added to reactor 13 separately or admixed with the butadiene, include pyrogallol, tert-butyl pyrocatechol, phenyl-β-naphthylamine, and the like. The amount of inhibitor will generally be in the range of from about 0.02 to about 1.0 weight percent based on the butadiene.

Upon the desired completion of the reaction, valve 28 in conduit 29 is opened to pass the molten reaction effluent from reactor 13 into treating vessel 31 which already contains a suitable hydrogenation solvent. Examples of such solvents include water, alcohols such as methanol, ethanol, isopropanol, and normal propanol, sulfolane, and admixtures of these solvents, and the like. In the process illustrated in the drawing, methanol is utilized. Additional methanol can then be added to vessel 31 through conduits 56 and 57. Agitation of the methanol and molten sulfolene can be provided by a suitable means, such as stirrer 32 driven by motor 33. The amount of solvent utilized is sufficient to provide a fluid solution and will generally be in the range of weight ratio of solvent to sulfolene of about 1:20 to 1:1.

A portion of the excess sulfur dioxide can be removed from the solution by a reduction of the pressure on the solution, for example, by flashing, stripping, pulling a vacuum, and the like. In the embodiment illustrated in the drawing a vacuum is pulled on the methanol-sulfolene solution to remove a major portion of the excess sulfur dioxide contained in the reaction effluent from reactor 13. One suitable system for pulling such vacuum is illustrated in the drawing, wherein conduit 37 provides communication between the upper portion of vessel 31 and the inlet of condenser 38. The outlet of condenser 38 can be vented to the atmosphere through conduit 39 and valve 41 to flare any unreacted sulfur dioxide and/or butadiene, after which the outlet of condenser 38 can be connected to the first inlet of aspirator 42 by way of conduit 43 and valve 44. Sulfolane can be introduced into the second inlet of aspirator 42 to cause withdrawal of sulfur dioxide and some methanol vapors from vessel 31 into the aspirator 42. The sulfolane containing the sulfur dioxide and methanol is passed from aspirator 42 by way of conduit 45 into a surge tank 46, from which it is withdrawn by pump 47 and through conduit 48 and cooler 49 back to the second inlet of aspirator 42. A portion of the sulfolane containing sulfur dioxide and methanol passes from conduit 48 through conduit 51 and heater 52 into flash tank 53. The sulfur dioxide and methanol vapors are vented from flash tank 53 by conduit 54. These vapors can be recovered for reuse, if desired. The flashed sulfolane passes from flash tank 53 through conduit 55 to surge tank 46.

The temperature and pressure in tank 31 during the vacuum operation will generally be in the range of from about 75° F. to about 150° F. and about 5 p.s.i.a. to about 50 mm. Hg absolute. The vacuum treatment will generally reduce the sulfur dioxide concentration in vessel 31 to less than 1 weight percent.

After the vacuum treatment is concluded, additional methanol can be introduced into vessel 31 through conduits 56 and 57 as desired. A treating agent selected from the group consisting of calcium oxide, calcium hydroxide, magnesium oxide, magnesium hydroxide and admixtures thereof is introduced into vessel 31 by way of conduit 58 and valve 59 to chemically convert any remaining sulfur dioxide to the corresponding sulfite salt, an excess of treating agent being preferred for this purpose. The mol ratio of treating agent to sulfur dioxide will generally be in the range of about 1:1 to about 10:1. In general the treating agent can be utilized in a solution or in suspension, preferably in the same solvent which is used for the sulfolene compound, with the concentration of treating agent in solvent ranging from 1 to 50 weight percent.

The particle size of treating reagent will generally be in the range of from about 0.2 inch to 0.005 inch (measured on its longest axis, and preferably about 0.1 inch to about 0.025 inch). Where calcium oxide or calcium hydroxide is used alone or in admixture with another of the treating agents of the invention, it is preferable that the solvent used with the treating agent and/or sulfolene compound be either an alcohol or a sulfolane or admixture thereof to provide high insolubility of the treating agent and the resulting sulfite salt.

An advantage of the use of the treating agents of the invention is that it is relatively impossible to overtreat. The treating agents and the corresponding sulfite salts have a low degree of solubility in the sulfolene-solvent solution. Thus there is no danger of excess treating agent catalyzing the formation of a sulfolanyl ether. The elimination of the use of relatively expensive hydrogen peroxide and sodium hydroxide avoids not only the possibility of catalyzing the formation of a sulfolanyl ether, but also eliminates the necessity for the time consuming analyses and computations necessary to assure that all of the sulfur dioxide is oxidized to sulfur trioxide without adding an appreciable excess of hydrogen peroxide and that the pH is in the desired range. Furthermore, the relatively inexpensive treating agents of the invention can be added to the sulfolene solution without prior treatment, as by vacuum, of the sulfolene solution to reduce the sulfur dioxide content. No heat addition or temperature control is required for the use of the treating agents of the invention, whereas in the conventional methods a fine balance must generally be maintained between the heat input and the rate of removal of sulfur dioxide to prevent cracking the sulfolene compound to produce additional sulfur dioxide. The sulfolene solution treated in accordance with the invention is noncorrosive. Yet another advantage of the invention resides in less consumption of solvent in the initial removal of sulfur dioxide from the solution by pressure reduction as it is not necessary to obtain as extensive a removal of the sulfur dioxide in this preliminary treatment.

A portion of the fluid contents of vessel 31 can be withdrawn therefrom during any or all of the venting, vacuum treating, and treating agent addition and passed through valve 61, conduit 62, pump 63, conduit 64, and valve 65 into and through indirect heat exchanger 66 wherein the fluid is heated. The thus heated fluid passes through valve 67 and conduits 68 and 57 into the vapor portion of vessel 31. The external heating circuit also provides greater agitation and admixing of the fluid components. The flow rate of the heat exchange fluid in conduit 71 can be regulated by valve 72 responsive to a comparison by temperature recorder controller 73 of the desired temperature setpoint 74 with the actual temperature of the fluid in conduit 68 as indicated by temperature sensor-transmitter 75. Heat exchanger 66 and its associated controls can be omitted, if desired, and the loop utilized just for mixing.

After the treatment is completed, the fluid contents of vessel 31 are withdrawn by way of valve 61, conduit 62, and passed by pump 63 through valve 76 into and through filter 77 to remove the insoluble sulfite salt, any excess insoluble treating agent, and any polymer which may have formed. It has unexpectedly been found that the filtering operation is improved by the use of the present invention in that the insoluble sulfite salts act as a filter aid, reducing plugging and increasing the degree of removal of solids from the solution. The filtered solution of the sulfolene compound in methanol is then passed through conduit 78 and valve 79 into hydrogenation reactor 81. A suitable hydrogenation catalyst is introduced into reactor 81 by way of conduit 82 and valve 83. Suitable catalysts include any of those known in the art useful in the catalytic hydrogenation of sulfolenes to sulfolanes. A preferred class of hydrogenation catalysts are those which comprise the metal hydrogenation catalysts, such as those containing or consisting of nickel, cobalt, copper, platinum, palladium or mixtures of these metals with themselves or with other metals such as iron, zinc, chromium, cadmium, etc. These metals may be used in finely divided form such as, for example, Raney nickel, or may be suitably supported on a support such as kieselguhr, aluminum oxide, diatomaceous earth, and the like. These catalysts can be prepared in any suitable manner, and a discussion of such preparation will be omitted in the interest of brevity. The amount of catalyst utilized will vary with the catalyst but will generally be in the range of about 1 to about 5 weight percent based on the sulfolene charged.

Hydrogen is introduced into reactor 81 by way of conduit 84 and valves 85 and 86. Valve 85 can be manipulated by pressure recorder controller 87 to maintain the hydrogen pressure in conduit 84 downstream of valve 85, as indicated by pressure sensor-transmitter 88, substantially constant. The amount of hydrogen utilized is sufficient to provide the desired hydrogenation pressure and will generally be in the range of about 10 p.s.i.g. to about 2000 p.s.i.g., preferably 50 p.s.i.g. to 500 p.s.i.g.

The reaction temperatures and pressures can vary over wide ranges. In fact any temperature is operable at which the reaction mixture is liquid, and which is below that at which the materials decompose. In order to avoid any substantial thermal decomposition, I prefer to operate below about 125° F., preferably in the range from about 50 to 120° F. Hydrogenation proceeds at hydrogen pressure above 5 pounds per square inch gauge and is effected quite rapidly and smoothly at 500 and 1500 pounds per square inch gauge. Pressures above this range can be employed if desired.

As the hydrogenation reaction is exothermic, valve 86 in conduit 84 can be manipulated by temperature recorder controller 89 responsive to a comparison of a desired temperature setpoint and the actual temperature in reactor 81, as indicated by temperature sensor-transmitter 91, to maintain the temperature in reactor 81 within a desired range. The pressure in reactor 81 can be maintained in the desired range by utilizing pressure recorder controller 92 to manipulate the temperature setpoint of controller 89 responsive to the pressure in reactor 81 as indicated by pressure sensor-transmitter 93. Agitation of the fluid contents of reactor 81 can be provided by stirrer 94 driven by motor 95. A coolant can be passed through conduit 96 into and through jacket 97 to aid in maintaining the temperature in reactor 81 in the desired range. Used coolant is removed through conduit 98.

Following completion of the hydrogenation reaction, the sulfolane product can be recovered by conventional procedures. Generally this comprises first cooling the reaction mixture, venting gases therefrom, filtering the cooled reaction mixture to remove catalyst, and fractionating the filtered reaction mixture to remove solvent and unreacted sulfolene.

Liquid level controller 101 actuates control of valve 108 located in the fluid actuating conduit 107 which passes control fluid to valve 102 in outlet conduit 103. Valve 106 is opened to remove the batch of hydrogenated material from reactor 81 upon completion of the reaction therein. In order to ensure that the reactor outlet 103 is not accidentally left open during filling with the next batch, the level controller 101 senses the low level in reactor 81 and overrides the control fluid actuating valve 108 to close valve 102 in conduit 103.

Also, vent valve 105 in conduit 104 can be used to vent reactor 81.

The following example is presented in further illustration of the invention and should not be construed to unduly limit the invention.

Reactor (16):
Initial temperature, ° F. _____ 140
Final temperature, ° F. _____ 200
Pressure range, p.s.i.g. _____ 300 to 100

Time cycle, hours:
    Charge, $SO_2$ _____ 1
    Heat to 140° F. _____ 1
    Charge butadiene _____ 4
    Retain at 200° F. _____ 1
    Discharge to vessel 31 _____ 1

Total time, hours _____ 8

| Materials, pounds | In | Out |
|---|---|---|
| Sulfur dioxide (12) | 1,620 | |
| Butadiene* (15) | 1,123 | |
| Crude sulfolene (29) | | 2,605 |
| Losses (5%) | | 138 |

*Contains about 0.05 wt. percent tert-butylpyrocatechol.

Sulfur dioxide removal (31):
    Initial temperature, ° F. _____ 80
    Final temperature, ° F. _____ 80

(a) Crude sulfolene (29) at 200° F. is dumped into vessel (31) containing methanol at 480° F. and flared at atmospheric pressure. Then a vacuum is effected to 100 mm. Hg absolute to remove unreacted $SO_2$ and butadiene.

Time cycle, hours:
    Filling (see above) _____ (1)
    Flaring and vacuum operation (to about 1% $SO_2$) _____ 1
    Addition of calcium hydroxide _____ 1
    Filtering _____ 1
    Preparing for next batch _____ 1

Total _____ 4 (5)

| Materials, pounds | In | Out |
|---|---|---|
| Crude sulfolene (29) | 2,605 | |
| Methanol | 2,605 | |
| Calcium hydroxide* | 50 | |
| Sulfolene-methanol | | 4,475 |
| Losses: | | |
|   Methanol | | 400 |
|   $SO_2$ | | 260 |
|   Sulfolene (decomposed) | | 117 |

* 0.05 inch size.

Hydrogenation (81):
    Temperature, ° F. _____ 100
    Pressure, p.s.i.g. _____ 200

Time cycle, hours:
    Charging (see above _____ 1
    Hydrogenating _____ 6
    Filtering (not shown) _____ 1

| Materials, pounds | In | Out |
|---|---|---|
| Sulfolene-methanol (78) | 4,475 | |
| Raney nickel (82) | 48 | |
| Kydrogen [1] (84) | 454 | |
| Kydrogen [2] (104) (vented) | | 421 |
| Sulfolene [3] (103) | | 215 |
| Methanol (103) [3] | | 2,250 |
| Sulfolane [3] (103) | | 2,018 |
| Losses (catalyst and heavies) (103) | | 73 |

[1] Impure hydrogen containing inerts such as methane can be used.
[2] Excess hydrogen.
[3] This product is treated by filtration and fractionation, not shown to recover product sulfolane.

Reasonable variations and modifications are possible within the scope of this disclosure without departing from the spirit and scope thereof.

I claim:

1. A process for the removal of excess sulfur dioxide from a solution of a sulfolene compound in a solvent for said sulfolene compound which comprises contacting said solution with a treating agent selected from the group consisting of calcium oxide, calcium hydroxide, magnesium hydroxide, and admixtures thereof, in an amount sufficient to convert at least a portion of said sulfur dioxide to the corresponding sulfite salt, said treating agent and said corresponding sulfite salt being at least substantially insoluble in said solution, and filtering the solution to which said treating agent has been added to remove the insoluble sulfite salt.

2. A process in accordance with claim 1 wherein said sulfolene compound is produced by contacting sulfur dioxide with a sulfolene precursor compound under suitable reaction conditions to cause the production of said sulfolene compound, said sulfolene precursor having the structural formula:

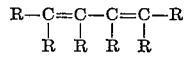

where each R is individually selected from the group consisting of hydrogen and organic and inorganic radicals.

3. A process in accordance with claim 2 wherein the reaction of the sulfur dioxide and the sulfolene precursor is conducted in the absence of a solvent, the resulting molten reaction effluent is contacted with a suitable solvent therefor, said solvent also being suitable as the solvent for the hydrogenation of the sulfolene compound to the corresponding sulfolane compound, further comprising subjecting the resulting solution to a partial vacuum to remove a portion of any unreacted sulfur dioxide contained in said solution prior to the addition of said treating agent.

4. A process in accordance with claim 1 further comprising contacting the thus filtered solution with hydrogen in the presence of a suitable hydrogenation catalyst under hydrogenation conditions to convert the sulfolene compound in the solution to the corresponding sulfolane compound.

5. A process in accordance with claim 2 wherein each said R is individually selected from the group consisting of hydrogen, alkyl, alkenyl, aryl, aralkyl, alkaryl and alicyclic radicals with the total carbon content of said precursor compound being in the range of 4 to 12.

6. A process in accordance with claim 5 wherein said solvent is selected from the group consisting of methyl alcohol, ethyl alcohol, isopropyl alcohol, water sulfolane compounds, and admixtures thereof.

References Cited

UNITED STATES PATENTS

| 2,402,891 | 6/1946 | Hooker et al. | 260—329 |
| 2,451,298 | 10/1948 | Morris et al. | 260—329 |
| 3,077,479 | 2/1963 | Luten et al. | 260—332.1 |

HENRY R. JILES, *Primary Examiner.*

C. M. SHURKO, *Assistant Examiner.*

U.S. Cl. X.R.

23—129, 252; 260—690

UNITED STATES PATENT OFFICE
CERTIFICATE OF CORRECTION

Patent No. 3,417,103                                                  December 17, 1968

Paul F. Warner

It is certified that error appears in the above identified patent and that said Letters Patent are hereby corrected as shown below:

Column 8, line 20, after "hydroxide," insert -- magnesium oxide, --.

Signed and sealed this 14th day of April 1970.

(SEAL)
Attest:

Edward M. Fletcher, Jr.                          WILLIAM E. SCHUYLER, JR.
Attesting Officer                                          Commissioner of Patents